No. 633,349. Patented Sept. 19, 1899.
W. & J. C. SWINDELL.
FURNACE.
(Application filed May 8, 1899.)
(No Model.) 2 Sheets—Sheet 1.
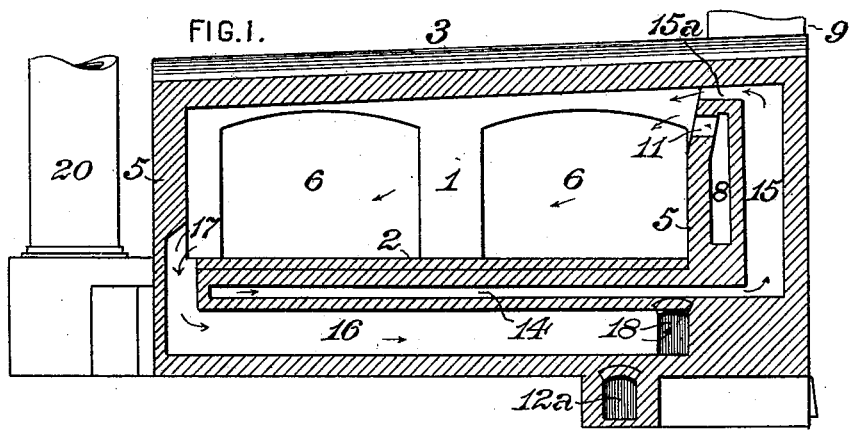
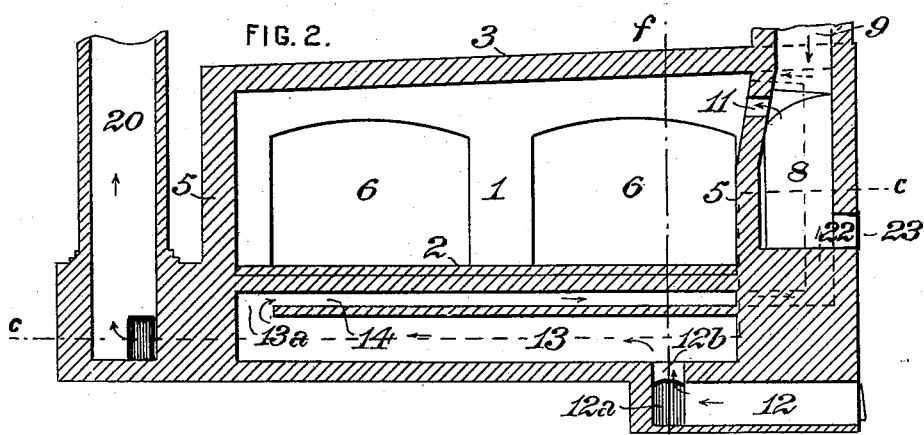
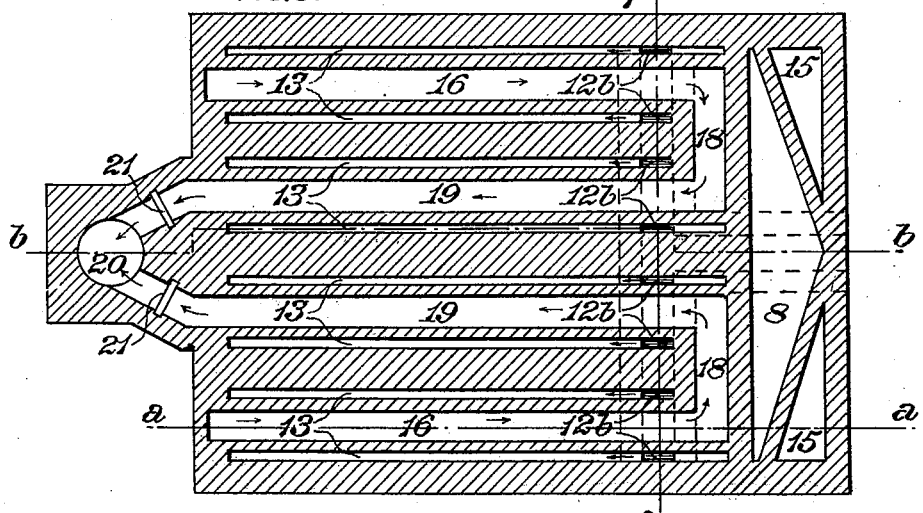
WITNESSES: INVENTORS,
James C. Herron. Wm Swindell,
S. R. Bell. John C. Swindell,
by J. Howden Bell,
Att'y.
THE NORRIS PETERS CO., PHOTO-LITHO., WASHINGTON, D. C.

No. 633,349. Patented Sept. 19, 1899.
W. & J. C. SWINDELL.
FURNACE.
(Application filed May 8, 1899.)
(No Model.) 2 Sheets—Sheet 2.

WITNESSES: INVENTORS.

UNITED STATES PATENT OFFICE.

WILLIAM SWINDELL AND JOHN C. SWINDELL, OF ALLEGHENY, PENNSYLVANIA.

FURNACE.

SPECIFICATION forming part of Letters Patent No. 633,349, dated September 19, 1899.

Application filed May 8, 1899. Serial No. 715,920. (No model.)

*To all whom it may concern:*

Be it known that we, WILLIAM SWINDELL and JOHN C. SWINDELL, of Allegheny, in the county of Allegheny and State of Pennsylvania, have invented a certain new and useful Improvement in Furnaces, of which improvement the following is a specification.

Our invention relates more particularly to metallurgical furnaces adapted for heating, reheating, or annealing by the employment of gaseous fuel; and its object is to provide a furnace in which a high and uniform degree of heat may be imparted to the material which is subjected to treatment and an economical consumption of fuel be attained, the construction of the furnace being such that the accessory supply, heating, and waste flues may be built or repaired without interference with the combustion-chamber or furnace-chamber proper.

The improvement claimed is hereinafter fully set forth.

Figure 4:
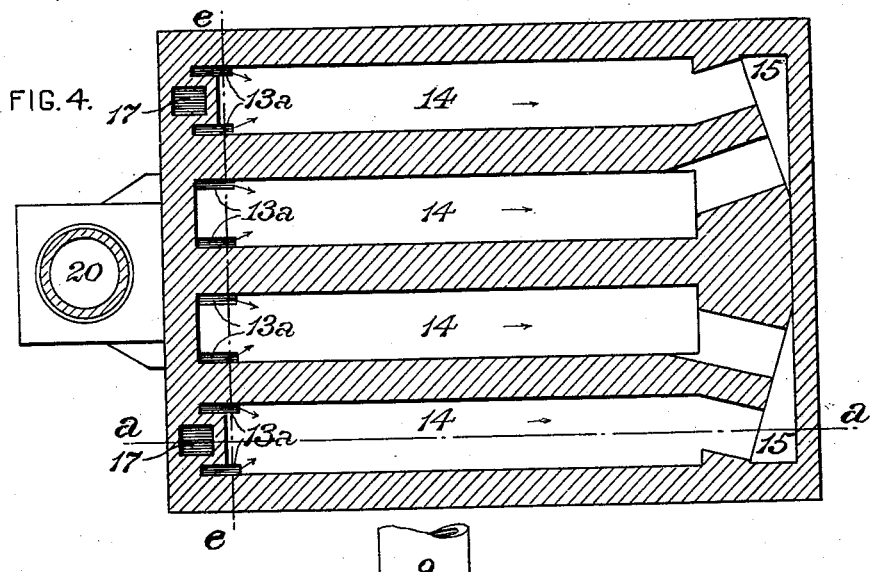
Figure 5:
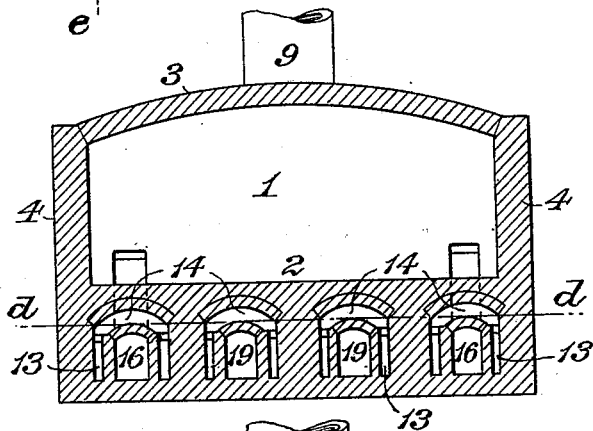
Figure 6:
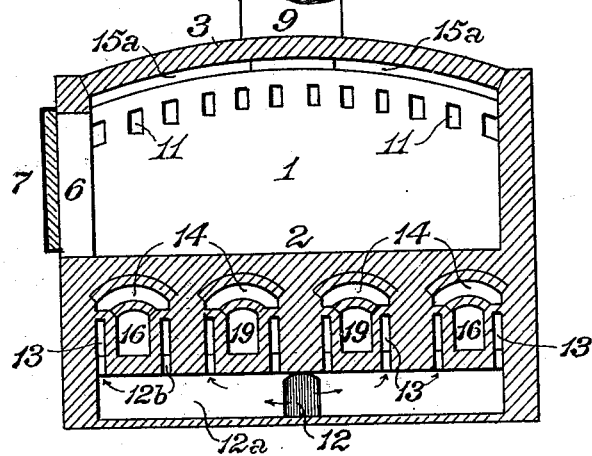

In the accompanying drawings, Figure 1 is a longitudinal section through a furnace embodying our invention, taken at the line $a\,a$ of Fig. 3; Fig. 2, a similar section at the line $b\,b$ of Fig. 3; Fig. 3, a horizontal section at the line $c\,c$ of Fig. 2; Fig. 4, a similar section at the line $d\,d$ of Fig. 5; Fig. 5, a transverse section at the line $e\,e$ of Fig. 4, and Fig. 6 a similar section at the line $f\,f$ of Figs. 2 and 3.

In the practice of our invention we construct a furnace having a combustion-chamber 1, which is ordinarily square or rectangular in horizontal section above its floor 2 and which is provided with a series of gas and air flues, to be presently described, below its floor. The combustion-chamber 1 is inclosed by and between the floor 2, an arched top or roof 3, side walls 4, and end walls 5, openings 6, closed by doors 7, being formed in one of the walls for the insertion and removal of the articles which are to be heated or annealed, as the case may be. The required degree of heat is imparted to the combustion-chamber and its contents by the combustion of a mixture of gas and heated air, which is supplied to the combustion-chamber through a series of flues located below its floor and through supply-passages formed in one of its walls, the essential features of which flues and passages are as follows:

A pipe 9, controlled by a suitable valve in the ordinary manner, leads from a gas-producer or other source of gas-supply to a gas-supply chamber 8, which adjoins the end of the combustion-chamber 1, and is provided near its top with a plurality of gas-supply ports 11, through which gas is admitted to the combustion-chamber and distributed with substantial uniformity throughout the width thereof for admixture with the proper proportion of heated air, which is admitted to the combustion-chamber through air-supply ports $15^a$, located above and adjacent to the gas-supply ports 11. Access to the gas-supply chamber 8 is afforded through an opening 22, controlled by a door 23.

An air-admission flue or conduit 12, the inlet-opening of which may be controlled by a suitable valve or register, communicates at its inner end with a transverse air-distribution flue $12^a$, located below the furnace. The flue $12^a$ communicates by ports $12^b$ with a plurality of air-heating flues 13, which extend longitudinally below the furnace and are located on opposite sides of and separated by comparatively thin walls from a plurality of waste-gas flues 16 19, to be presently described. The air-heating flues 13 communicate through ports $13^a$ at their ends farther from the ports $12^b$ with longitudinal air-heating flues 14, which extend longitudinally from end to end of the furnace and are interposed between the floor 2 of the combustion-chamber and the waste-gas flues 16 19, before referred to, being separated by comparatively thin walls from the combustion-chamber and from said waste-gas flues, so that the currents passing through them may be heated thereby. The air-heating flues 14 lead into air-supply chambers 15, which adjoin the gas-supply chamber, and the heated air passes from the chambers 15 into the combustion-chamber through the air-supply ports $15^a$, which, as before stated, are located above and adjacent to the gas-supply ports 11. The currents of gas and heated air passing out of the ports 11 and $15^a$ commingle adjacent to the delivery ends of said ports and the resultant mixture is ignited and burned in the combustion-chamber, imparting a high degree of heat thereto.

The waste gases are discharged from the combustion-chamber through ports 17, located at the end of the chamber farther from the gas and air supply ports, into waste or discharge flues 16, which extend longitudinally below and throughout the length of the combustion-chamber. Each of the waste-flues 16 is located immediately below one of the air-heating flues 14 and is interposed between two of the air-heating flues 13. The waste-flues 16 are connected by transverse flues 18 with return waste-flues 19, extending parallel with the waste-flues 16 to a common stack 20, their communication with which is controlled by valves or dampers 21. The relation of the return waste-flues 19 to the air-heating flues is the same as that of the waste-flues 16—that is to say, each of the flues 19 is located immediately below one of the air-heating flues 14 and is interposed between two of the air-heating flues 13. Each of the waste-flues is thus adjoined on three sides by air-heating flues, and the heat of the escaping products of combustion is thereby effectively utilized in heating the incoming currents of air. The specific disposition of the waste-flues 16 and 19 in pairs on opposite sides of a central stack, as shown and described, is not an essential of our invention, as a transverse flue 18, similar to those shown, might without variation of operative principle be employed to connect the two flues 19 and the waste gases be conducted continuously in alternately-reversed directions through the system of flues 16 19.

In the operation of the furnace gas from the source of supply passes through the pipe 9 into the gas-chamber 8 and thence through the gas-supply ports into the combustion-chamber 1. Air enters at the outer end of the admission-conduit 12 and thence passes in divided currents through the air-heating flues 13 and returns in opposite directions through the air-heating flues 14 to the air-supply chambers 15, from which it is discharged into the combustion-chamber through the air-supply ports 15ª, which are in close proximity to the gas-supply ports 11. The gas and air meet and are mingled adjacent to the outlets of the ports 8 and 15ª and the mixture is ignited and burns in the combustion-chamber, the heat evolved being exerted upon the metal or other material placed therein. The hot products of combustion pass from the combustion-chamber by the ports 17 into the waste-flues 16 and thence through the connecting-flues 18 and waste-flues 19 to the stack 20. In their passage through the flues 16 and 19 their heat is imparted to the walls thereof and thence to the currents of air passing through the air-heating flues 13 14 on three sides thereof to the combustion-chamber. The heat of the waste gases is thoroughly and effectively utilized before their escape into the stack, and the form of the system of flues and their relation to the combustion-chamber are such that they may be constructed, renewed, or repaired without interference with the furnace proper.

We claim as our invention and desire to secure by Letters Patent—

1. In a furnace, the combination of a combustion-chamber, gas-supply ports communicating with said chamber at the end thereof, means for supplying gas to said ports, discharge-ports in the vertical wall of said combustion-chamber opposite the gas-supply ports, waste-flues, leading underneath the combustion-chamber from said discharge-ports to a point of exit, horizontal air-flues above said waste-flues and extending between the same and the floor of the combustion-chamber, lateral air-flues adjacent the sides of the waste-flues and communicating with said horizontal air-flues at one end, a transverse air-flue beneath said lateral air-flues and communicating therewith at the other end, means connecting said transverse flue to the atmosphere and means connecting said horizontal flues to the combustion-chamber.

2. In a furnace, the combination of a combustion-chamber, gas and air supply chambers adjoining a wall of the combustion-chamber and communicating by supply-ports therewith, discharge-ports leading out of the combustion-chamber adjacent to the end thereof farther from the gas and air supply ports, waste-flues communicating with the discharge-ports and leading therefrom, below the combustion-chamber, to a point of discharge, a transverse air-distribution flue located below the furnace and communicating with an air-inlet, a system of air-heating flues extending on opposite sides of the waste-flues, and connected by ports at one end with the air-distribution flue, and a system of air-heating flues communicating with the flues of the first specified system at their ends farther from the air-distribution flue, and leading from such communication, between the waste-flues and the floor of the combustion-chamber, into the air-supply chamber.

WILLIAM SWINDELL.
JOHN C. SWINDELL.

Witnesses:
J. SNOWDEN BELL,
CLARENCE A. WILLIAMS.